May 12, 1959 K. M. ELLIOTT ET AL 2,886,507
METHOD OF SUPPLYING ENDOTHERMIC HEAT OF REACTION
Filed July 7, 1954 5 Sheets-Sheet 1

INVENTORS
Kenneth M. Elliott
Louis P. Evans
BY Francis F. Johnston
AGENT

May 12, 1959 K. M. ELLIOTT ET AL 2,886,507
METHOD OF SUPPLYING ENDOTHERMIC HEAT OF REACTION
Filed July 7, 1954 5 Sheets-Sheet 2

INVENTORS
Kenneth M. Elliott
BY Louis P. Evans
Francis F. Johnston
AGENT

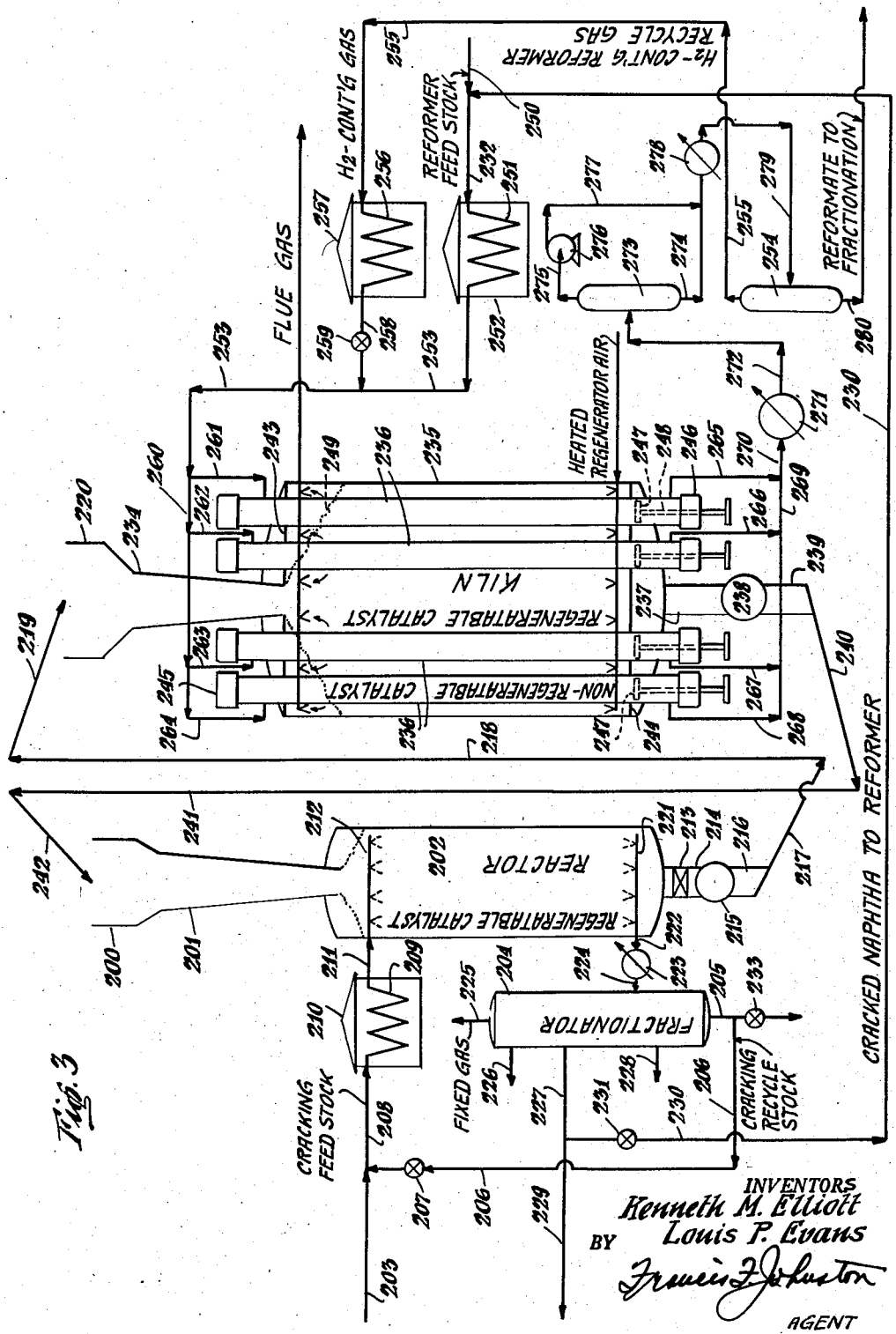

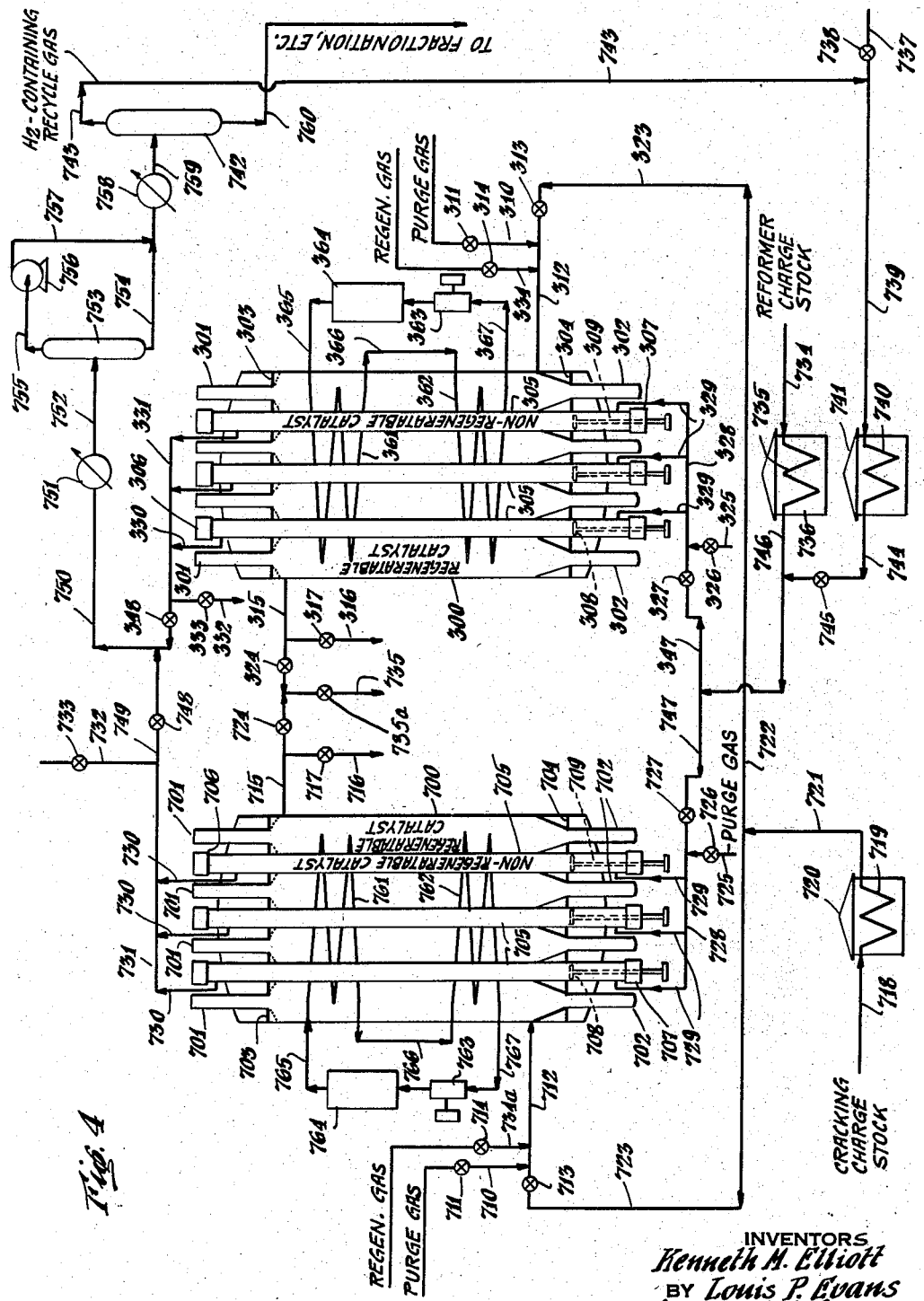

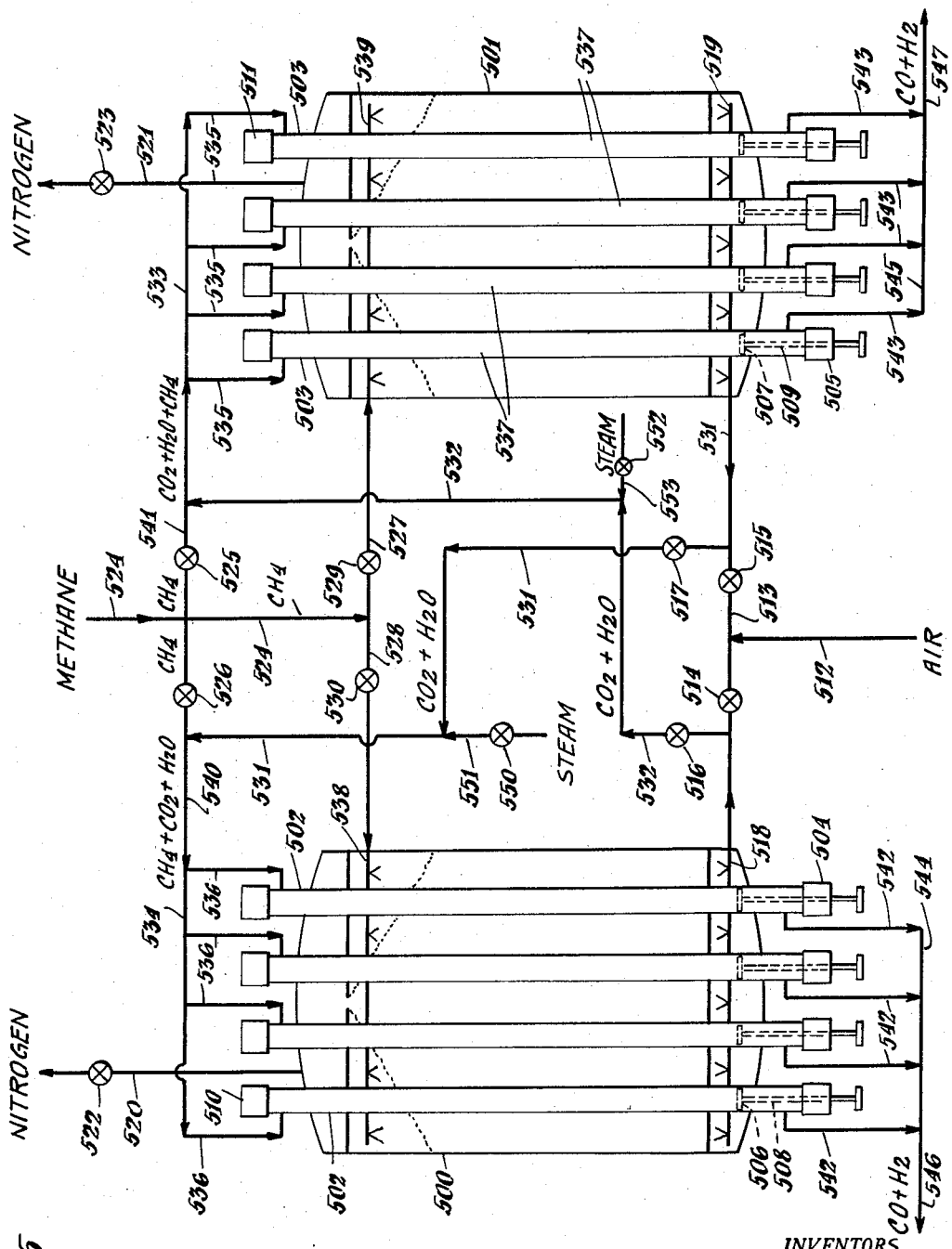

United States Patent Office 2,886,507
Patented May 12, 1959

2,886,507

METHOD OF SUPPLYING ENDOTHERMIC HEAT OF REACTION

Kenneth M. Elliott and Louis P. Evans, Woodbury, N.J., assignors to Socony Mobil Oil Company, Inc., a corporation of New York Application July 7, 1954, Serial No. 446,992

6 Claims. (Cl. 208—78)

The present invention relates to supplying heat to endothermic reactions and more particularly to a method for supplying heat to an endothermic reaction employing a non-regeneratable catalyst by means of a second reaction which is cyclic in nature.

Many methods for supplying heat to an endothermic reaction zone have been disclosed heretofore. Heat may be supplied to such an endothermic reaction zone either directly or indirectly. Among the various methods which have been proposed, the following may be mentioned:

(1) Reheating reactants between reaction zones,
(2) Recycling preheated inert gas to the reaction zone,
(3) Indirect transfer of heat across walls separating reactor and regenerator,
(4) Addition of feed at a temperature above reaction temperature at a plurality of points,
(5) Supplying reaction heat by preheating catalyst.

All of these methods have various disadvantages. It is now proposed that the heat of an endothermic reaction taking place over a fixed bed of catalyst, either regenerative or non-regenerative, be supplied by indirect heat exchange with a second reaction of cyclic nature. In other words, the present invention provides for (1) two different and separate reactions; (2) one reaction which produces a combustible deposit on the catalyst such that periodical regeneration is required to maintain catalyst activity; (3) the other reaction is conducted substantially continuously, that is to say, there is little or no deposit laid down on the catalyst which reduces its activity substantially, but the reaction requires a substantial amount of heat to proceed; and (4) the heat supplied in the cyclic reaction can be efficiently utilized to provide the heat requirements of the substantially non-cyclic reaction.

Illustrative of reactions which can be combined in this manner are those of reforming hydrocarbons as the non-cyclic reaction and catalytic cracking of hydrocarbons as the cyclic type of operation, or the production of carbon dioxide and water in a cyclic operation and conversion of the carbon dioxide and water to carbon monoxide and hydrogen in a substantially non-cyclic operation. In other words, in the cyclic operation an excess of heat is produced at some stage in the cycle which, in accordance with the principles of the present invention, is transferred to the reaction zone in which the substantially non-cyclic reaction is taking place. Accordingly, it is an object of the present invention to provide a method of supplying the required heat of an endothermic reaction which is substantially non-cyclic by indirect heat exchange with at least a part of the components of a cyclic catalytic reaction system. It is a further object of the present invention to provide a method of carrying out a substantially non-cyclic endothermic reaction wherein the required heat of the endothermic reaction is supplied by indirect heat exchange with the catalyst of a cyclic reaction wherein the catalyst is deactivated by a combustible deposit in which the heat of combustion of the aforesaid deposit is supplied to the aforesaid substantially non-cyclic endothermic reaction. Thus, other objects and advantages will become apparent from the following descriptions taken in conjunction with the drawings in which, Figure 1 is a highly schematic flow sheet illustrating a method for supplying heat to a substantially non-regenerative reforming catalyst reaction, wherein cracking catalyst during regeneration is heated to a temperature such that the heat stored in the regenerated cracking catalyst is sufficient to supply the heat of reaction required not only for the cracking reaction but also for the reforming reaction;

Figure 3 is a highly schematic flow sheet wherein a plurality of reaction zones for the substantially non-cyclic reaction are in heat exchange with catalyst from a cyclic reaction during the regeneration operation;

Figure 4 is a highly schematic flow sheet illustrating the combination of a bed in situ substantially non-cyclic catalytic reaction and a bed in situ cyclic reaction wherein the regenerative catalyst of the cyclic reaction is regenerated by combustion of the deactivating deposit in heat exchange with the reaction zones wherein the substantially non-cyclic endothermic reaction takes place;

Figure 5 is a highly diagrammatic flow sheet illustrating means of supplying the required heat of the endothermic reaction of the conversion of carbon dioxide and water to carbon monoxide and hydrogen by the heat generated in regenerating the catalyst employed in converting methane to carbon dioxide and water.

Illustrative of the application of the principles of the present invention to the combination of the substantially non-cyclic endothermic reaction generally know as "reforming" and catalytic cracking involving a moving bed, is the data presented in Table I. Table I presents a summary of typical operating conditions for the substantially non-cyclic reforming reaction, and typical operating conditions for the cyclic catalytic cracking of hydrocarbons as illustrated in a schematic manner in Figure 4.

TABLE I

*Reforming*

| | |
|---|---:|
| Pressure, p.s.i.a. | 500 |
| Inlet temperature, °F. (mixed recycle gas and naphtha) | 850 |
| Average reaction temperature, °F. | 905 |
| Average tubewall temperature, °F. | 920 |
| Total heat required, B.t.u./lb. naphtha | 315 |
| Recycle ratio, mols H₂/mols naphtha | 10 |
| Space velocity, v./hr./v | 2.75 |
| Product: | |
|    Yield (C₄+reformate), vol. percent | 93 |
|    Octane No.— | |
|       M–1 clear | 90 |
|       F–1+3 cc. TEL | 98 |

*Cracking*

| | |
|---|---:|
| Presssure, p.s.i.a. | 25 |
| Oil inlet temperature, °F. | 825 |
| Average temperature, °F. | 925 |
| Space velocity, v./hr./v | 2.0 |
| Cycle time, minutes | 2 |

Temp. start of regen. cycle, °F. _____ 900
Temp. end of regen. cycle, °F. _____ 950
Yields:
    $C_4+$ free gasoline, vol. percent _____ 37.3
    10# R.V.P. gasoline, vol. percent _____ 41.5
    Light distillate fuel oil, vol. percent _____ 26.0
    Heavy fuel oil, vol. percent _____ 21.0
    Dry gas, wt. percent _____ 6.9
    Coke, wt. percent _____ 3.6
    Total $C_4$'s, vol. percent _____ 16.0

Table II sets forth the reactor dimensions for processing 15,000 barrels per day of gas oil and 15,000 barrels per day of naphtha according to the flow sheet set forth in Figure 4.

TABLE II

*Reactor dimensions (2 required)*

Charge rates _____ {15,000 b.p.d. naphtha.
                                 {15,000 b.p.d. gas oil.
Length _____ 25 ft.
Inside diameter _____ 12.5 ft.
Tubes _____ 8500 ¾" pipes on 1½" triangular centers.

Figure 1:
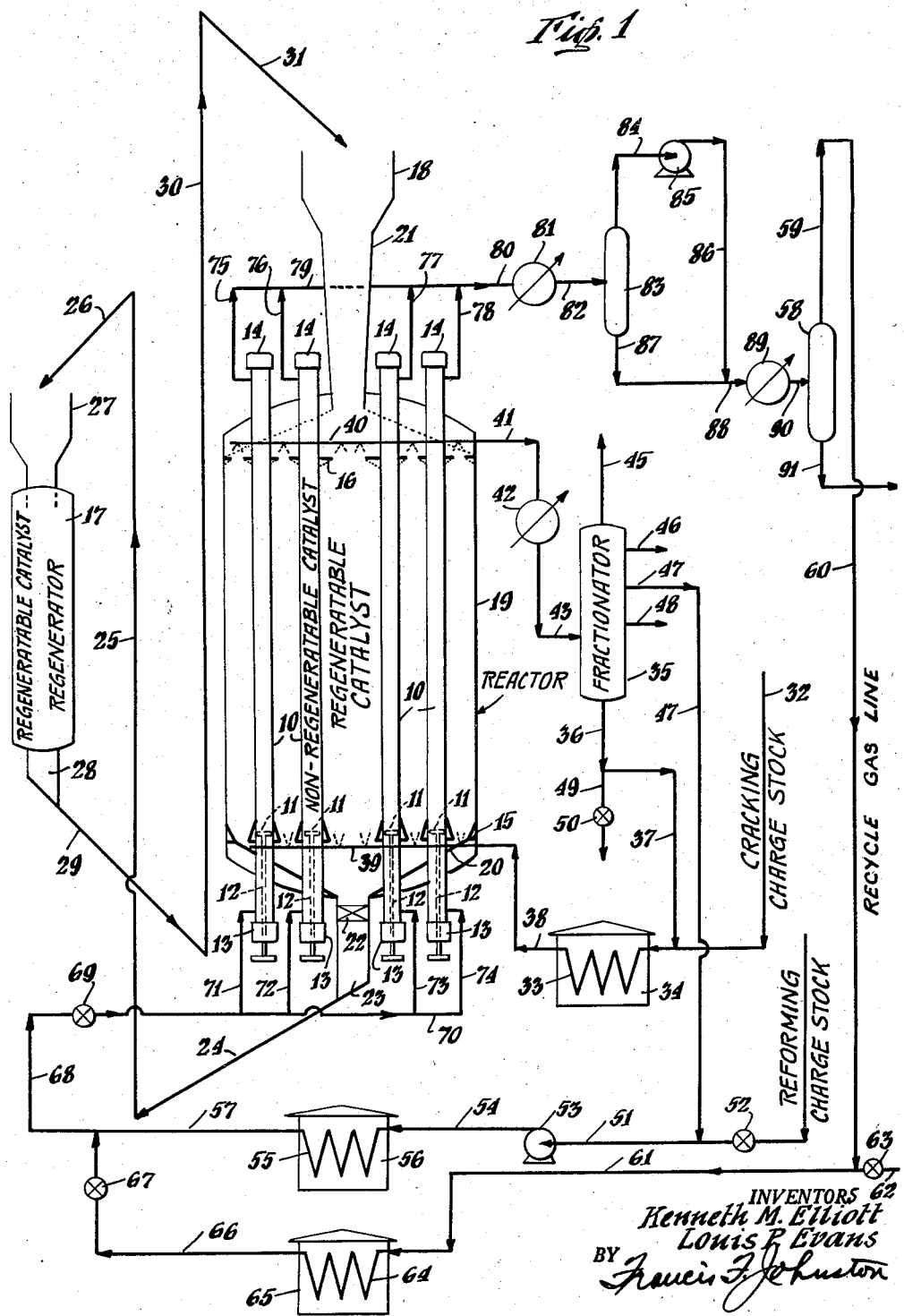

Referring now to Figure 1, the highly schematic flow sheet presented as Figure 1 is illustrative of the use of a platinum-type substantially non-regeneratable reforming catalyst in combination with a regeneratable type cracking catalyst used in a cyclic manner. The designation "substantially non-regeneratable" type catalyst is used to include those catalysts which only require regeneration at relatively long intervals of say 1 to 6 months or more. A platinum type reforming catalyst comprising about 0.1 to about 0.5 percent platinum or a platinum group metal on an alumina and silica carrier is a suitable catalyst for reforming hydrocarbons. However, the reforming reaction is an endothermic one and the introduction of heat from an extraneous source into the reforming zone is necessary to maintain reforming conditions of temperature. In accordance with the principles of the present invention, a particle-form platimum type substantially non-regeneratable reforming catalyst or any other suitable particle-form substantially non-regeneratable reforming catalyst is introduced into tubes 10. Tubes 10 are supported within reactor 19 by tube plates 15 and 16. Tubes 10 are of such size and capacity that the required residence time for the volume of hydrocarbons to be treated per unit of time is sufficient to yield a reformate of the required octane number. Tubes 10 are provided with foraminous plates or discs 11 supported by rods 12 which in turn are rotatably mounted in removable caps 13 at the lower ends of tubes 10. Tubes 10 are also provided with removable caps 14.

The substantially non-regeneratable reforming catalyst is introduced into tubes 10 in the following manner: Caps 13 are turned-up on the lower ends of tubes 10 until foraminous disc or plate 11 is positioned at a level in tubes 10 above the tube-supporting plate 15, at a level slightly above the lower level of the reaction zone in which the catalytic cracking of hydrocarbons to be described hereinafter takes place. With caps 14 removed, particle-form substantially non-regeneratable solid reforming catalyst is introduced into tubes 10 and the space within tubes 10 more or less loosely packed with the aforesaid substantially non-regeneratable particle-form solid reforming catalyst to a level not higher than the upper level of the catalytic cracking zone indicated by tube-supporting plate 16. After the tubes 10 have been filled to about this level with particle-form solid substantially non-regeneratable reforming catalyst, caps 14 are replaced on the upper ends of tubes 10 in a gas-tight manner.

Particle-form regeneratable cracking catalyst such as silica-alumnia cracking catalyst comprising about 90% silica and about 10 percent alumina, either fresh or regenerated in regenerator or kiln 17 is introduced into reactor feed hopper 18 in such quantity as to fill reactor 19 from the cone bottom 20 to the bottom of conduit 21 and to fill conduit 21 to the bottom of hopper 18. The temperature of the fresh or regenerated catalyst is such and the volume of the catalyst passing through reactor 19 is so regulated that the heat stored in the catalyst is sufficient to supply the heat of reaction required for the cracking of the hydrocarbons and for the reforming of the naphtha in tubes 10. In other words, for a reactor catalytically cracking 10,000 barrels per day of gas oil over a silica-alumina catalyst containing about 10 percent alumina, and treating in tubes 10 over a platinum-type reforming catalyst about 5,000 barrels of naphtha per day, the silica-alumina cracking catalyst enters reactor 19 at a temperature of about 1000° F. to about 1300° F., and preferably about 1050° F. to about 1150° F. at a rate of about 100 to about 600 tons per hour, preferably about 250 to about 450 tons per hour. Concomitantly, the gas oil to be cracked enters the reactor at a temperature of about 600° F. to about 900° F., preferably about 750° F. to about 850° F., and in a catalyst to oil weight ratio of about 1 to about 10, preferably about 4 to about 8. Simultaneously, the straight run naphtha to be reformed in tubes 10 in admixture with recycle gas in the ratio of about 3 to about 20, preferably about 5 to about 15 mols of recycle gas, or about 2 to about 20, preferably about 4 to about 14 mols of hydrogen per mol of straight run naphtha to be reformed, is introduced into tubes 10.

In passing through reactor 19 the silica alumina cracking catalyst becomes contaminated with a carbonaceous deposit generally referred to as "coke," which at least partially deactivates the silica-alumina cracking catalyst. Therefore, for economic reasons the at-least-partially deactivated silica-alumina catalyst must be regenerated by combustion of the aforesaid carbonaceous deposit or coke in a stream of combustion supporting gas. Toward this end the silica alumina catalyst flows from reactor 19 through catalyst flow control means 22 which can be a throttling valve into conduit 23, thence to a chute 24 to a catalyst transfer means 25 of any suitable type such as a gas lift, elevator, etc. The partially deactivated particle-form silica-alumina cracking catalyst is transferred from chute 24 to chute 26 by means of the aforesaid catalyst transfer means 25. The at least partially deactivated silica-alumina cracking catalyst flows along chute 26 to kiln or regenerator feed hopper 27. From kiln or regenerator feed hopper 27 the partially deactivated silica-alumina cracking catalyst flows downwardly through regenerator or kiln 17 to conduit 28. Kiln 17 is of any suitable type wherein the aforesaid carbonaceous deposit on the catalyst can be burned off in a stream of combustion supporting gas such as air.

The catalyst flowing from kiln 17 which has been reactivated by combustion of the carbonaceous deposit enters conduit 28 and flows thence along chute 29 to catalyst transfer means 30 of any suitable type such as an elevator, or elevators, gas lift or the like. By means of catalyst transfer means 30 the regenerated catalyst is raised from chute 29 to chute 31 along which it flows to reactor feed hopper 18 ready to begin another cycle through the catalytic cracking reaction zone.

The charge stock to be cracked is drawn from a source not shown through line 32. The cracking charge stock, for example, gas oil, flows along line 32 to coil 33 in heater 34. Recycle stock obtained as described hereinafter flows from fractionator 35 through line 36 and line 37 to line 32 where it is mixed with the fresh gas oil in suitable proportions, for example, about 5 to about 50 percent of the charge to heater 34. In heater 34 the mixture of recycle stock and fresh gas oil is heated to a temperature of about 600° to about 900° F., preferably about 750° to about 850° F. The heated charge mixture flows from coil 33 through line 38 to distributor 39 located in the region of the bottom of reactor 19. Distributor 39 is of any suitable type by means of which the cracking charge stock can be distributed over the cross section of reactor 19. The vapors of the charge stock rise through the cracking zone counter-current to the downwardly flowing particle-form silica-alumina cracking catalyst. In passage upwardly through the cracking zone the charge stock is converted to gasoline and lighter hydrocarbons, and the vapors therein are withdrawn from the catalytic cracking zone through collector 40 and line 41 to heat exchanger 42. From heat exchanger 42 the effluent from the cracking zone flows along line 43 to fractionator 35. In fractionator 35 the desired cuts can be made. Thus, for example, fixed gases are withdrawn through line 45. Light gasoline is withdrawn through line 46, heavier naphtha for reforming is withdrawn through line 47, diesel fuel and fuel oil are withdrawn through line 48 and the bottoms representing recycle stock is withdrawn through line 36. As required, or desired, a portion of the recycle stock is withdrawn from the system through line 49 under control of valve 50, the balance of the bottoms or recycle stock being returned to the fresh feed line 32 through line 37.

When the cracking operation has reached equilibrium and the temperature of the catalyst in tubes 10 has been brought to the reaction temperature required to produce at the pressure existing in tubes 10 a reformate of the required octane rating, naphtha suitable for reforming is drawn from fractionator 35 through line 47 to line 51. Since the naphtha requiring reforming to provide a gasoline of the required octane rating is not produced in sufficient quantity in the catalytic cracking taking place in reactor 19, additional naphtha which may be either straight run or thermally or catalytically cracked naphtha is drawn from a source not shown through line 51 under control of valve 52 and mixed with the catalytically cracked naphtha drawn from fractionator 35 through line 47. The mixture of naphtha drawn from fractionator 35 through line 47 and additional naphtha drawn from a source not shown is discharged by pump 53 into line 54. The naphtha mixture flows along line 54 to coil 55 in heater 56. The heated mixture of naphtha flows from coil 55 in heater 56 through line 57. Hydrogen-containing recycle gas flows from liquid gas separator 58 through lines 59 and 60 to line 61. Generally the recycle gas produced in the reforming reaction in tubes 10 over the platinum-type catalyst contains about 80 to about 95 percent hydrogen and is in sufficient quantity to provide the hydrogen atmosphere found desirable in reforming over a platinum-type catalyst. However, in starting up and at other times, should the volume of recycle gas be insufficeint, hydrogen can be drawn from an extraneous source through line 62 under control of valve 63. The hydrogen-containing recycle gas flows along line 61 under a pressure somewhat greater than that existing in tubes 10 to coil 64 in heater 65.

The charge naphtha is heated in coil 55 to a temperature such that when mixed with heated hydrogen containing recycle gas in the ratio of about 3 to about 20 mols of recycle gas or about 2 to about 20 mols hydrogen per mol of charge naphtha, the charge mixture so formed has a temperatureof about 800° to about 1000° F. preferably about 900° to about 980° F.

The heated hydrogen-containing recycle gas flows from coil 64 through pipe 66 under control of valve 67 to line 57 where it is mixed with the heated charge naphtha in the proportions set forth hereinbefore to form a charge mixture. The charge mixture flows along line 68 under control of valve 69 to manifold 70 provided with a plurality of branches such as branches 71, 72, 73 and 74, by means of which the charge mixture is introduced into tubes 10. If desired valves, not shown, can be inserted in branches 71, 72, 73 and 74 to regulate the flow of charge mixture to each tube to provide uniformity of charge to each tube. The charge mixture flows upwardly in tubes 10 and the reaction products are withdrawn from tubes 10 through branches 75, 76, 77 and 78 to manifold 79. The effluent from the reforming zones, tubes 10, flows from manifold 79 to line 80 and thence to heat exchangers and condensers represented by 81. From the heat exchange equipment 81 the effluent from the reforming zones flows along line 82 to liquid gas separator 83.

In liquid gas separator 83 the condensible effluent separates from the non-condensed effluent. The non-condensed effluent is drawn from liquid gas separator 83 through line 84 by pump 85. Pump 85 discharges the non-condensed effluent into pipe 86. The condensed effluent is drawn from liquid gas separator 83 by a pump not shown through line 87. The non-condensed effluent and the condensed effluent are mixed in line 88, flow through heat exchanger 89 and line 90 to liquid gas separator 58. In liquid gas separator 58 the condensed effluent is separated from the non-condensed effluent and flows through line 91, to finishing, storage and/or distribution. The non-condensed effluent, i.e., hydrogen-containing recycle gas, flows from separator 58 through pipe 59 to pipe 60 and pipe 61 to be reheated as described hereinbefore for re-use in the reforming zones tubes 10.

The following table gives an example of the present invention when practiced according to the diagram shown in Figure 1:

TABLE III

*Cracking*

Catalyst—silica-alumina
Charge stock—Mid-Continent wire-cut gas oil (44.5 to 89.5 vol. percent crude)

Reactor:
    Oil rate _____b.p.d__ 10,000
    Catalyst rate _____tons/hour___ 410
    Oil inlet temp. _____°F__ 730
    Catalyst inlet temp. _____°F__ 1100
    Pressure _____p.s.i.a__ 25
    Space velocity _____ 4
    Catalyst outlet temp. _____°F__ 900
    Average cracking temp. _____°F__ 950
    Vapor outlet temp. _____°F__ 900
Kiln:
    Catalyst inlet temp. _____°F__ 900
    Catalyst outlet temp. _____°F__ 1100
    Catalyst rate _____tons/hour___ 410
Yields:
    $C_4$ free gasoline, vol. percent_____ 30
    10# R.V.P. gasoline, vol. percent _____ 33
    Fuel oil, vol. percent _____ 55
    Dry gas, wt. percent _____ 9
    Coke, weight percent _____ 3
    Total $C_4$'s, vol. percent _____ 12

*Reforming*

Catalyst—0.35 wt. percent platinum on silica-alumina charge stock—200–400° F. Kansas naphtha Reactor:
    Naphtha rate _____b.p.d__ 5,000
    Mols recycle gas per mol of naphtha_____ 12
    Mols hydrogen per mol of naphtha_____ 10
    Mixed vapor inlet temp. _____°F__ 925
    Mixed vapor outlet temp. _____°F__ 915
    Space velocity, vol./hr./vol. cat. _____ 2
Yields:
    Dry gas, weight percent_____ 6.6
    $C_4$'s, vol. percent _____ 9.2
    $C_5$'s vol. percent _____ 7.3
    $C_6+$, vol. percent _____ 75.5
    Octane number—
        Research clear _____ 90
        Research, 3 cc. _____ 98
    10 R.V.P. gasoline yield, vol. percent_____ 92.0

Over all heat balance

|  | MM B.t.u./Hr. | Percent of Total |
|---|---|---|
| Heat Available: |  |  |
| Heat of Combustion of Coke in Kiln | 50 | 100 |
| Heat Used: |  |  |
| Heat of Reaction for Reforming | 16 | 32 |
| Heat of Reaction for Cracking | 10 | 20 |
| Sensible Heat to Cracked Products | 16 | 32 |
| Loss in Kiln Flue Gases | 8 | 16 |
| Total | 50 | 100 |

Figure 2:
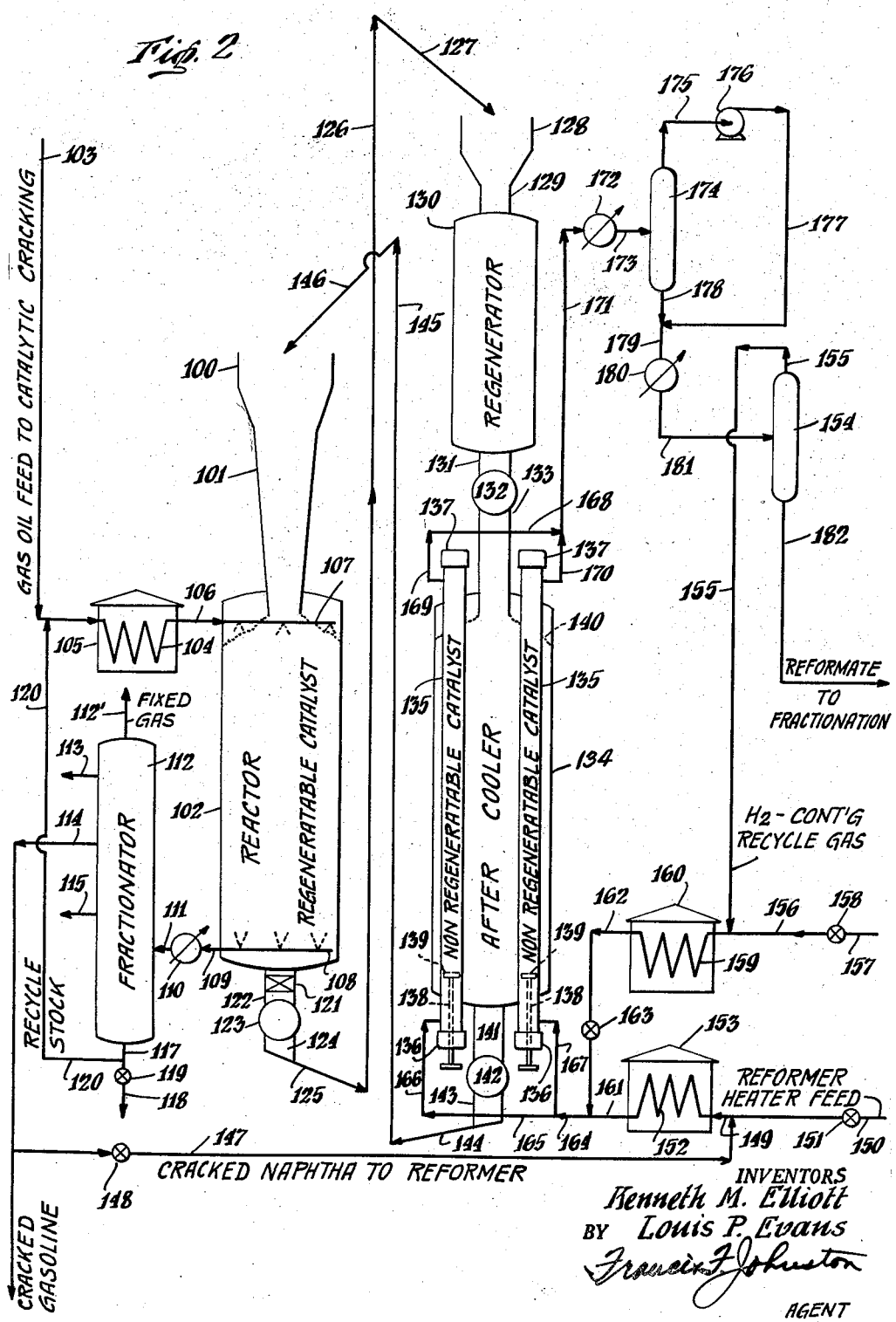
Figure 2 is a highly schematic flow sheet illustrative of a method of supplying the required heat of endothermic reaction by the heat stored in the catalyst participating in a cyclic reaction wherein the catalyst of the cyclic reaction after regeneration passes through an after-cooler wherein a plurality of reaction zones are in heat transfer with the aforesaid regenerated cyclic catalyst.

Referring now to Figure 2 which is a highly schematic flow sheet of a method of applying the principles of the present invention wherein the tubes of particle-form substantially non-regenerative catalyst are placed in the after-cooler of a regenerator or kiln in which cracking catalyst is regenerated. Thus, hot active particle-form regeneratable cracking catalyst in feed hopper 100 flows through conduit 101 into cracking reactor 102. Feed stock suitable for catalytic cracking such as gas oil is drawn from a source not shown through line 103. The gas oil flows along line 103 to coil 104 in heater 105. In heater 105 the gas oil charge stock is heated to a temperature of about 600° to about 900° F., preferably about 750 to about 850° F. The heated gas oil charge stock flows from coil 104 through line 106 to distributor 107 in reactor 102.

Distributor 107 is of any suitable type whereby the charge stock, i.e., gas oil, is distributed over the cross section of reactor 102.

The temperature of the hot cracking catalyst flowing into reactor 102, the temperature of the charge stock flowing into reactor 102 from heater 105 and the ratio of catalyst-to-oil, i.e., charge stock, are regulated to provide cracking conditions of temperature in reactor 102.

The charge stock, i.e., gas oil, and catalyst flow concurrently downwardly through reactor 102. The vaporous reaction products are withdrawn from reactor 102 through collector 108 of any suitable type. The reaction products flow from collector 108 to line 109 and thence to heat exchanger equipment designated as 110. From heat exchange equipment 110 the reaction products flow through line 111 to fractionator 112. In fractionator 112 the usual or desired products are fractionated out. Thus, for example, fixed gases are withdrawn through pipe 112'. Light gasoline is withdrawn through pipe 113 to finishing, storage and/or distribution. Heavier gasoline is withdrawn through line 114. Distillate fuel oil is withdrawn through line 115 and the bottoms which is recycle stock for the cracking operation is withdrawn through line 117. As required, a portion of the recycle stock or bottoms of fractionator 112 is withdrawn from the system through line 118 under control of valve 119. The balance of the bottoms or recycle stock flows through line 120 to line 103 to be mixed with fresh gas oil in the desired proportions, say about 5 to about 50 percent of the charge to heater 105.

During passage downwardly through reactor 102 the cracking catalyst becomes at least partially deactivated by the deposit of a carbonaceous material usually designated as "coke." For economic reasons, the catalyst must be regenerated. Regeneration is achieved by combustion of the coke in a stream of combustion supporting gas such as air. Accordingly, the at-least-partially deactivated cracking catalyst flows from reactor 102 under control of catalyst flow control means 121 which can be a throttle valve. Catalyst flows from catalyst flow control means 121 through conduit 122 to surge bin 123 and thence to conduit 124. From conduit 124 the at-least-partially deactivated cracking catalyst flows along conduit 125 to any suitable catalyst transfer means 126 such as a gas lift, elevator or the like.

By means of catalyst transfer means 126, the at-least-partially deactivated catalyst is transferred to chute 127 along which it flows to regenerator or kiln hopper 128.

From regenerator or kiln hopper 128 the at-least-partially deactivated catalyst flows along conduit 129 to regenerator 130 of any suitable type wherein the carbonaceous deposit on the cracking catalyst can be burned off in a stream of combustion supporting gas such as air.

The hot regenerated catalyst flows from kiln or regenerator 130 through conduit 131 into surge tank 132 and thence through conduit 133 to after cooler 134. In after cooler 134 there are placed a plurality of catalyst tubes 135.

Catalyst tubes 135 are of any suitable size and number required to provide the volume required for the residence time necessary for the other reaction, for example, a reforming reaction over a particle-form substantially non-regeneratable reforming catalyst.

Catalyst tubes 135 are provided with removable caps 136 and 137. Removable caps 136 are provided with rotatable rods 138 supporting foraminous discs or plates 139.

At the beginning of the operation, caps 136 are mounted at the bottoms of catalyst tubes 135 in such a position that plates 139 are at a level within the region in heat exchange with the catalyst flowing from regenerator 130. Caps 137 having been removed, particle-form non-regeneratable reforming catalyst is placed in tubes 135 on plates 139 and to a height in catalyst tubes 135 preferably not greater than level 140 of the top of the mass of catalyst flowing through the after-cooler.

As the hot regenerated particle-form cracking catalyst flows through the after-cooler, it is in heat exchange with the reaction zones formed within the catalyst tubes 135, and supplies the required heat of endothermic reaction. The regenerated cracking catalyst is cooled in the after-cooler by heat exchange with the reaction zones in tubes 135 to a temperature such that when passed through reactor 102 in the catalyst-to-oil ratio and with the gas oil feed stock at the required temperature, the reaction zone in reactor 102 will be held at cracking temperatures of about 600 to about 1000° F. and preferably about 700 to about 950° F. The hot catalyst flows from after-cooler 134 through conduit 141 to surge bin 142 and thence through conduit 143 to chute 144 which feeds the hot regenerated catalyst to any suitable catalyst transfer means 145. By means of catalyst transfer means 145 the hot regenerated catalyst is raised to chute 146 along which it flows to reactor feed hopper 100 ready for use in another cracking cycle.

It will be noted that the flow sheet Figure 2 provides for reforming of the cracked gasoline withdrawn from fractionator 112 through line 114. All or part of the cracked gasoline flowing along line 114 can be diverted through line 147 under control of valve 148 to reformer heater feed line 149. In the event that the capacity of the reforming zones in catalyst tubes 135 is greater than the volume of cracked naphtha produced in the catalytic cracking portion, additional feed naphtha can be drawn from a source not shown by a pump not shown and discharged into line 150. Such additional feed naphtha flows along line 150 under control of valve 151 to line 149 where it can be mixed with the cracked naphtha drawn from fractionator 112 flowing through line 147. The reformer feed, i.e., cracked naphtha from fractionator 112 only, or mixed with naphtha from an extraneous source, flows along line 149 to coil 152 in heater 153.

Hydrogen-containing recycle gas flows from liquid gas separator 154 through pipe 155 to pipe 156. When the volume of hydrogen-containing recycle gas is not sufficient to provide the recycle gas necessary for reforming operation, additional hydrogen-containing gas can be drawn from a source not shown by a pump not shown and discharged into pipe 157. From pipe 157 the additional hydrogen-containing gas will flow into pipe 156 under control of valve 158. The hydrogen-containing gas flows along pipe 156 to coil 159 in heater 160.

In reforming over a particle-form substantially non-regeneratable platinum-type catalyst, the reformer feed stock, i.e., naphtha, is mixed with hydrogen-containing gas in the ratio of about 3 to about 20 mols of hydrogen-containing gas or about 2 to about 20 mols of hydrogen per mol of naphtha to form a reformer charge mixture.

The reformer charge mixture is introduced into the reforming zones in catalyst tubes 135 at a temperature of about 800° to about 1000° F., preferably about 900° to about 980° F., and a pressure of about 100 to about 800, preferably about 200 to about 600 pounds per square inch. Accordingly, the naphtha is heated in coil 152 to a temperature such that when mixed with the hydrogen-containing gas heated in coil 159 in the ratio set forth hereinbefore, the charge mixture so produced will have a temperature of about 800° to about 1000° F., preferably about 900° to about 980° F. Consequently, the charge naphtha will be heated to a temperature about 700° to about 900° F., preferably about 800° to about 850° F. in coil 152 and the hydrogen-containing gas will be heated in coil 159 to a somewhat higher temperature, in order to raise the temperature of the charge naphtha to the required temperature of the charge mixture.

The heated charge naphtha flows from coil 152 in heater 153 through line 161. The heated hydrogen-containing gas flows from coil 159 in heater 160 through pipe 162 under control of valve 163 to line 161 where it is mixed with the charge naphtha in the ratio set forth hereinbefore to form a charge mixture.

The charge mixture flows along line 164 to manifold 165 and branches thereof 166 and 167. The charge mixture flows through branches 166 and 167 to catalyst tubes 135. The charge mixture flows upwardly through catalyst tubes 135, i.e., reformer reaction zones, to effluent manifold 168 through effluent manifold branches 169 and 170. (Those skilled in the art will realize that although only two catalyst tubes 135 are shown, this is not a limitation of the number of catalyst tubes which can be placed in after-cooler 134.)

The effluent from the reforming zones in catalyst tubes 135 flows from manifold 168 to line 171 and thence to heat exchange equipment designated 172. From heat exchange equipment 172 the cooled effluent flows along line 173 to liquid gas separator 174.

In liquid gas separator 174 the condensed effluent is separated from the non-condensed effluent. The non-condensed effluent is withdrawn from liquid gas separator 174 through line 175 by blower 176. Blower 176 discharges the non-condensed effluent into pipe 177 through which it flows to line 179.

The condensed effluent is withdrawn from liquid gas separator 174 through line 178 by a pump not shown and mixed with the non-condensed effluent in line 179. The condensed and non-condensed effluent in line 179 is under a pressure somewhat higher, say about 5 to 10 pounds, than the pressure in the reforming zones in catalyst tubes 135 and for a platinum type catalyst usually about 100 to about 800, preferably about 200 to about 600 p.s.i.

The mixture of condensed and non-condensed effluent flows along line 179 to condenser 180. From condenser 180 the condensed and non-condensed effluent flows along line 181 to liquid gas separator 154. In liquid gas separator 154 the condensed effluent is separated from the non-condensed effluent. The condensed effluent flows from liquid gas separator 154 through line 182 to fractionation, stabilization, finishing, storage and/or distribution. The uncondensed effluent flows from liquid gas separator 154 through line 155 to line 156 to be reheated in coil 159 of heater 160 to the required temperature for reforming.

For a reactor and after-cooler handling 10,000 barrels per day of gas oil feed to the cracking reactor and 5,000 barrels per day of naphtha to the reforming zones in catalyst tubes 135, the following temperatures and catalyst-to-oil ratios are required:

| | Broad | Preferred |
|---|---|---|
| Regenerated Catalyst Inlet to After-Cooler, °F | 1,000–1,300 | 1,050–1,200 |
| Catalyst Temperature Outlet of After-Cooler, °F | 950–1,200 | 1,000–1,100 |
| Cracking Catalyst-to-oil Ratio | 1 to 10 | 4 to 8 |
| Inlet Temperature Cracking Charge Stock, °F | 600–900 | 750–850 |
| Inlet Temperature Reformer Charge Stock, °F | 800–1,000 | 900–980 |
| Outlet Temperature Hydrogen gas heating coil, °F | 900–1,100 | 950–1,050 |
| Outlet Temperature Naphtha Heater Coil 152, °F | 700–900 | 800–850 |

Referring now to Figure 3, the flow sheet shown illustrates the application of the principles of the present invention by the use of a regenerator for the regenerative catalyst as the site of the reaction involving the substantially non-regenerative catalyst. Thus, a hot active particle-form regenerative catalyst flows from reactor feed hopper 200 through conduit 201 to reactor 202. For purposes of illustration, the regenerative catalyst will be assumed to be any suitable particle-form regenerative cracking catalyst.

Feed stock to the catalytic cracking reaction flows from a source not shown through line 203. Recycle stock flows from fractionator 204 through lines 205 and 206 under control of valve 207. The recycle stock is mixed with the cracking feed stock in line 208 to form a cracking charge mixture in which the recycle stock is about 5 to about 50 percent of the cracking charge mixture.

The cracking charge mixture flows through line 208 to coil 209 of heater 210. In coil 209 the cracking charge mixture is heated to about 600 to about 900° F. and preferably about 750 to about 850° F.

The heated cracking charge mixture flows from coil 209 in heater 210 through line 211 to distributor 212. Distributor 212 is of any suitable type whereby the charge mixture can be spread over the cross-section of reactor 202.

The hot active particle-form solid regeneratable cracking catalyst enters reactor 202 at a temperature of about 900 to about 1200° F., preferably about 950 to about 1050° F. The hot cracking charge mixture (including catalyst) enters reactor 202 at a temperature of about 800 to about 1000° F., preferably about 850 to about 950° F., and at a catalyst-to-oil ratio of about 1 to about 10-to-1.

The catalyst and cracking charge mixture flow concurrently downwardly through reactor 202. During passage downwardly through reactor 202 the catalyst is at least partially deactivated by contamination with a carbonaceous deposit usually termed "coke." For economic reasons, this deposit must be removed and the coke burned off to reactivate the catalyst. Accordingly, the catalyst and cracking charge mixture flow concurrently downwardly through reactor 202.

The at-least-partially-deactivated catalyst flows from reactor 202 under regulation of catalyst flow control means 213, which can be a throttling valve, to conduit 214 and surge chamber 215. From surge chamber 215 the at-least-partially-deactivated catalyst flows to conduit 216 and thence to chute 217.

Chute 217 discharges the at-least-partially-deactivated catalyst into catalyst transfer means 218 which can be of any suitable type such as a gas lift, elevator, etc.

Catalyst transfer means 218 discharges the at-least-partially-deactivated catalyst into chute 219 along which the at-least-partially-deactivated catalyst flows to regenerator or kiln feed hopper 220.

Returning now to the vaporous contents of reactor 202. The cracking charge stock converted at least in part to products of the catalytic cracking reaction flows from reactor 202 through collector 221 to line 222, thence to heat exchange equipment designated 223 and line 224 to fractionator 204.

In fractionator 204 the effluent from cracking reactor 202 is fractionated into a plurality of products. For example, fixed gas is withdrawn through pipe 225, light gasoline through 226, cracked gasoline through 227, distillate fuel oil through 228 and bottoms or recycle stock through 205.

The cracked gasoline flows to finishing, stabilization, storage and/or distribution through line 229. All or part of the cracked gasoline can be diverted through line 230 under control of valve 231 to reformer feed stock line 232.

A portion of the bottoms of fractionator 204 is withdrawn from the system through line 205 under control of valve 233, while the balance of the bottoms flows through line 206 under control of valve 207 to line 203 where it is mixed with fresh feed.

Returning now to the at-least-partially deactivated particle-form cracking catalyst in kiln feed hopper 220. The at-least-partially deactivated cracking catalyst flows from kiln feed hopper 220 through conduit 234 into kiln 235. The partially deactivated cracking catalyst enters kiln or regenerator 235 at a temperature of about 800 to about 1000° F., preferably about 850 to about 950° F.

Kiln 235 is of any suitable type in which the deactivating carbonaceous deposit on the cracking catalyst can be burned off in a stream of combustion supporting gas. Kiln 235 is also provided with catalyst tubes 236 forming reaction zones in which an endothermic reaction takes place in the presence of a particle-form, substantially non-regeneratable catalyst, for purpose of illustration, a particle-form substantially non-regeneratable reforming catalyst.

The at least partially deactivated cracking catalyst flows downwardly through kiln 235 counter-current to an upwardly flowing stream of heated combustion-supporting gas such as air. The coke deposited on the catalyst is burned-off and the heat of combustion serves to heat the regenerated cracking catalyst to the temperature required in reactor 202 and to supply the extra heat of reaction required in the reaction zones in catalyst tubes 236.

The cracking catalyst is reactivated in kiln 235 and flows from kiln 235 at a temperature of about 900° to about 1200° F., preferably about 950° to about 1050° F. through conduit 237.

The reactivated catalyst flows through conduit 237 to surge bin 238, thence to conduit 239 and chute 240. The regenerated catalyst flows along chute 240 to catalyst transfer means 241 which can be of any suitable type, for example gas-lift, elevator, etc., whereby the regenerated catalyst is transferred from chute 240 to chute 242. The regenerated catalyst flows along chute 242 to reactor feed hopper 200 to begin another cycle.

Returning now to kiln or regenerator 235 and catalyst tubes 236, catalyst tubes 236 are supported in any suitable manner within kiln 235 as by spiders 243 and 244. Catalyst tubes 236 are provided with removable caps 245 and 246 which make gas-tight joints with the upper and lower ends of tubes 236. Catalyst tubes 236 are also provided with movable foraminous plates or discs 247 rotatably mounted on rods 248 which in turn are rotatably mounted on the caps 246.

Caps 246 are adjusted to provide a gas-tight joint with tubes 236 and to place foraminous plates 247 preferably at a level such that the whole of the reaction zones formed within the catalyst tubes 236 above plates 247 is in heat exchange with the cracking catalyst undergoing regeneration in kiln 235.

With caps 245 removed, particle-form substantially non-regeneratable catalyst is placed in tubes 236 to a height preferably not substantially higher than the upper level 249 of the bed of cracking catalyst undergoing regeneration. The rate of combustion of the coke deposited on the cracking catalyst in kiln 235 is regulated in various ways known to those skilled in the art, i.e., by dilution of the combustion supporting gas with an inert gas, by means of heat transfer medium in heat exchange with the catalyst to be regenerated, etc., to insure that the heat transmitted from the catalyst being regenerated to the reaction zones within the tubes 236 is not in substantial excess of the heat required by the endothermic reaction taking place therein.

The particle-form substantially non-regeneratable catalyst having been placed in tubes 236 and caps 245 having been placed on the tubes 236 in a gas-tight manner, the temperature in the reaction zones within tubes 236 is brought to a reaction temperature. For reforming naphtha over a platinum-type catalyst such as one comprising about 0.1 to about 0.5 percent platinum on an alumina or silica, or silica-alumina carrier, the reaction temperature is about 800° to about 1000° F., preferably about 900° to about 980° F., and the reaction pressure is about 100 to about 800, preferably about 200 to about 600 p.s.i.

As was stated hereinbefore, cracked naphtha from fractionator 204 can be reformed in the reforming zones in tubes 236 in kiln 235. However, usually it will be preferable in order to have reforming operation of economic size to reform naphtha other than that produced in reactor 202 in admixture with that produced in reactor 202. Accordingly, naphtha flows from a source not shown through line 250 and is mixed with cracked naphtha from fractionator 204 in any suitable proportion in line 232. The naphtha mixture flows along line 232 to coil 251 in heater 252. The heated naphtha mixture flows from coil 251 through line 253.

Gaseous heat carrier, for example hydrogen-containing gas and particularly hydrogen-containing recycle gas, flows from liquid gas separator 254 through pipe 255 to coil 256 in heater 257 through pipe 258 under control of valve 259 and is mixed with the heated naphtha mixture in line 253.

The heated gaseous heat carrier and heated naphtha mixture are mixed in the ratio of about 3 to about 20, preferably about 5 to about 15 mols of gaseous heat carrier per mol of naphtha or in the ratio of about 2 to about 20 mols of hydrogen per mol of naphtha to provide a reformer charge mixture having a temperature of about 800° to about 1000° F., preferably about 900° to about 980° F. Accordingly, the naphtha mixture is heated in coil 251 to about 700° to about 900° F. and the gaseous heat carrier is heated in coil 256 of heater 257 to about 900° to about 1100° F.

The heated reformer charge mixture having a temperature of about 800° to about 1000° F., preferably about 900° to about 980° F., flows along line 253 to manifold 260, having branches 261, 262, 263 and 264.

The charge mixture flows through branches 261, 262, 263 and 264 to catalyst tubes 236 within which is the particle-form substantially non-regeneratable reforming catalyst. The charge mixture flows downwardly over the fixed beds of particle-form substantially non-regeneratable reforming catalyst. The reaction products are withdrawn from tubes 236 through lines 265, 266, 267 and 268 to manifold 269. From manifold 269 the reformer effluent flows along line 270 to heat exchange equipment 271, thence along line 272 to liquid gas-separator 273.

In liquid gas separator 273 the condenser effluent separates from the uncondensed effluent of reformers 236. The condensed effluent flows from liquid gas separator 273 through line 274 while the uncondensed effluent is drawn from liquid-gas separator 273 through pipe 275 by pump 276.

Pump or compressor 276 discharges the uncondensed effluent into pipe 277 at a pressure somewhat higher, say 5 to 10 p.s.i. than the pressure in the reforming zones in tubes 236.

The uncondensed effluent flows along pipe 277 to line 274 where it is mixed with the condensed effluent. The mixed condensed and uncondensed effluent flows along line 274 to condenser 278 and thence along line 279 to liquid-gas separator 254.

In liquid gas separator 254 the condensed effluent separates from the uncondensed effluent and flows along line 280 to fractionation, stabilization, finishing, storage and/or distribution.

The uncondensed reforming zones effluent separated in liquid gas separator 254 provides the hydrogen-containing gaseous heat carrier, i.e., recycle gas. The recycle gas flows along pipe 255 from the liquid gas separator 254 to coil 256 in heater 257.

Referring now to Figure 4, the flow sheet shown in Figure 4 is illustrative of the application of the principles of the present invention to the use of a static bed of regeneratable catalyst and a static bed of substantially non-regeneratable catalyst. Thus, for example, a static bed of particle-form solid regeneratable catalyst is used in a cyclic manner, a cycle comprising an on-stream period followed by an off-stream regenerating period. The heat produced in the regeneratable catalyst during regeneration is transferred at least in part to the substantially non-regeneratable catalyst and the reaction zones in which the substantially non-regeneratable catalyst is present. For the purpose of illustrating the principles of the present invention as applied to a static bed of regeneratable catalyst and to a static bed of substantially non-regeneratable catalyst, the flow sheet Figure 4 is illustrative of one method of employing a static bed of particle-form regeneratable cracking catalyst such as a silica-alumina cracking catalyst comprising about 8 to about 12 percent alumina and the balance substantially silica and a static bed of particle-form substantially non-regeneratable reforming catalyst such as a platinum type reforming catalyst comprising about 0.1 to about 0.5 percent platinum on a silica or alumina or silica-alumina catalyst.

Thus, since the regeneratable catalyst is used as a static bed, a plurality of reactors is required for continuous operation. Accordingly, reactors 700 and 300, provided with catalyst feed conduits 701 and 301 and catalyst withdrawal conduits 702 and 302, each provided with gas-tight closures, are filled with active particle-form regeneratable cracking catalyst in any suitable manner.

Supported within reactors 700 and 300 in any suitable manner as by spiders 703 and 704 and 303 and 304, are a plurality of tubes 705 and 305 within which is placed the particle-form substantially non-regeneratable reforming catalyst. It follows that the reforming reaction takes place within tubes 705 and 305 and that therefore the reforming zones are within these tubes 705 and 305.

Tubes 705 and 305 are provided with caps 706 and 707 and 306 and 307 respectively. Each of tubes 705 and 305 are provided with a foraminous disc or plate 708 and 308 respectively slideably mounted in tubes 705 and 305 respectively. Rods 709 and 309 are rotatably mounted in caps 707 and 307 respectively.

Prior to introducing the particle-form substantially non-regeneratable reforming catalyst into tubes 705 and 305, plates 708 and 308 are positioned in tubes 705 and 305 at about the lower level of the static bed of cracking catalyst in reactors 700 and 300. Adjustment of the level of plates 708 and 308 is obtained by advancing or retracting caps 707 and 307 on tubes 705 and 305. Plates 708 and 308 being positioned as aforedescribed, the particle-form substantially non-regeneratable catalyst is introduced into tubes 705 and 305 until the upper level of the bed of catalyst in each tube is at approximately the same level as the upper level of the bed of cracking catalyst in each reactor. Caps 706 and 306 are then replaced on tubes 705 and 305 in a gas-tight manner.

Before the catalyst can be put on stream, each reaction zone must be purged. Therefore, starting the operation with reactor 700 on stream and reactor 300 idle, purge gas, i.e. inert and/or non-flammable gas such as flue gas flowing from a source not shown through pipe 710 under control of valve 711, passes to line 712 with valves 713 and 714 closed. The purge gas flows into the bottom of the static bed of cracking catalyst, flows upwardly therethrough and is vented through line 715 and pipe 716 under control of valve 717. After purging is completed, the bed of cracking catalyst is raised to cracking temperatures of about 700° to about 1000° F., preferably about 850° to about 950° F., in any suitable manner as by passing hot inert gas therethrough.

When the temperature of the catalyst bed has been raised to cracking temperatures, cracking charge stock, for example, gas oil, is drawn from a source not shown through line 718 heated in coil 719 of heater 720 and flows thence through line 721 to line 722. With valve 313 closed, the heated cracking charge stock (hereinafter referred to as gas oil) flows to line 723 and thence under control of valve 713 to a distributor, not shown, of any suitable type whereby the gas oil vapors can be distributed over the cross-section of the static bed of cracking catalyst in reactor 700.

The vapors of the charge stock flow upwardly through the bed of regeneratable particle-form cracking catalyst and leave reactor 700 through line 715 with valves 717, 317 and 324 closed and valve 724 open, the cracking effluent flows through line 735 under control of valve 735a to heat exchangers, stabilizers, fractionators and the like.

The cracking of the gas oil produces a carbonaceous deposit, generally called "coke," which is laid down on the catalyst. Eventually, the deposit causes sufficient reduction in the activity of the catalyst that regeneration thereof is required. Accordingly, when the condition of the catalyst is such as to require regeneration, the unit is taken off stream by diverting the cracking charge stock to reactor 300. Diversion of the cracking charge stock to reactor 300 is achieved by closing valve 713 and opening valve 313. However, reactor 300 must be purged and brought to cracking temperature first. A description of the operation of reactor 300 while the cracking catalyst in reactor 700 is being regenerated will be deferred until a description of the regeneration of the cracking catalyst in reactor 700 has been given.

After the charge stock has been diverted from reactor 700 to reactor 300, the bed of cracking catalyst and in general the cracking zone in reactor 700 is purged by passing inert and/or non-flammable gas such as flue gas through the cracking reaction zone. Thus, inert and/or non-flammable gas such as flue gas flows under control of valve 711 from a source not shown through pipe 710 and line 712 with valve 713 closed and is vented through line 715 and pipe 716 under control of valve 717 with valve 724 closed.

After purging the cracking zone in reactor 700, the catalyst is regenerated by burning the coke thereon in a stream of heated combustion-supporting gas such as air. Accordingly, heated air flows from a source not shown through pipe 734a under control of valve 714 to line 712 (valve 713 closed) and thence into the cracking zone of reactor 700. The regenerating gas flows upwardly through the bed of cracking catalyst burning the coke and producing flue gas which escapes from reactor 700 through line 715 and pipe 716 under control of valve 717 with valve 724 closed.

When the temperature in the reforming zones within catalyst tubes 705 has been raised to a reforming temperature of about 800° to about 1000° F., preferably about 850° to about 980° F., by the heat generated in the combustion of the coke on the cracking catalyst, introduction of heated reforming charge mixture into catalyst tubes 705 is begun. It is to be noted that prior to introducing the reforming charge mixture into tubes 705, the tubes have been purged by passing inert and/or non-flammable gas from a source not shown through pipe 725 under control of valve 726, with valve 727 closed, to manifold 728 and branches thereof 729, and thence into tubes 705. The purge is vented from tubes 705 through manifold branches 730, manifold 731 and pipe 732 under control of valve 733 with valve 748 closed.

The reforming zones in tubes 705 having been purged as described hereinbefore, reformer charge stock, i.e., naphtha, is drawn from a source not shown under a pressure somewhat, say 5 to 10 p.s.i., higher than reforming pressure, through line 734 and flows through coil 735 in heater 736.

In heater 736 the reformer charge stock, i.e., naphtha, is heated to a reforming temperature varying with the substantially non-regeneratable catalyst used and for a platinum type catalyst comprising about 0.1 to about 0.5 percent platinum on an alumina or silica or alumina-silica catalyst to a temperature such that when mixed with hydrogen-containing gaseous heat carrier for example recycle gas from the reforming reaction having a temperature of about 900° to about 1100° F., preferably about 950° to about 1050° F., in the ratio of about 3 to about 20 mols per mol of naphtha to form a reformer charge mixture, the charge mixture has a temperature of about 800° to about 1000° F., preferably about 900° to about 980° F.

Hydrogen-containing gaseous heat carrier is heated in coil 740 in heater 741. When starting the first time, hydrogen-containing gas from an extraneous source, not shown, is drawn through line 737 under control of valve 738. After equilibrium has been established, hydrogen-containing recycle gas separated from the condensed reformer effluent in liquid-gas separator 742 flows under pressure somewhat, say 5 to 10 p.s.i. greater than reformer pressure from liquid-gas separator 742 through pipe 743 to pipe 739. The hydrogen-containing gas (whether from an extraneous source or recycle gas from liquid-gas separator 742) flows through pipe 739 to coil 740 in heater 741.

In heater 741 the hydrogen-containing gas is heated to a temperature of about 900° to about 1100° F., preferably about 950° to about 1050° F. The heated hydrogen-containing gas flows from coil 740 into pipe 744 and thence under control of valve 745 into line 746.

The heated reformer charge stock flows from coil 735 in heater 736 into line 746. The heated reformer charge stock is mixed with heated hydrogen-containing gaseous heat carrier in the proportion set forth hereinbefore to provide a heated reformer charge mixture having a reforming temperature and at least a reforming pressure of about 100 to about 800, preferably about 200 to about 600 p.s.i. for the platinum-type catalyst described hereinbefore.

The heated reformer charge mixture flows along line 746 to line 747 and, with valves 726 and 327 closed and valve 727 open, flows to manifold 728 and its branches 729.

The reformer charge mixture flows from manifold branches 729 into the reforming zones in the plurality of tubes 705 and thence upwardly through tubes 705 in contact with the substantially non-regeneratable particle-form reforming catalyst in the tubes. The reforming zones effluents flow from the reforming zones through manifold branches 730 to manifold 731 and thence under control of valve 748 through lines 749 and 750 to heat exchange equipment designated 751 and line 752 to liquid-gas separator 753.

In liquid-gas separator 753 the condensed reformer effluent separates from the hydrogen-containing uncondensed reformer effluent. The condensed effluent flows from separator 753 through line 754 while the uncondensed reformer effluent is withdrawn from separator 753 through pipe 755 by compressor 756 and discharged under a pressure somewhat, say 5 to 10 p.s.i., greater than the pressure in tubes 705 into pipe 757. The hydrogen-containing uncondensed reformer effluent flows along pipe 757 to line 754 wherein it is mixed with condensed reformer effluent. The mixed condensed and uncondensed reformer effluent flows along line 754 to condenser 758 and line 759 to liquid-gas separator 742.

In liquid-gas separator 742 the condensed reformer effluent or reformate is separated from the hydrogen-containing uncondensed reformer effluent and flows therefrom through line 760 to stabilization and/or fractionation, finishing, storage and/or distribution.

The hydrogen-containing uncondensed reformer effluent, i.e., recycle gas, separated in liquid-gas separator 742 flows through pipe 743 to pipe 739 and heater 741.

It will be understood that the reforming reaction takes place in tubes 705 while the cracking catalyst in reactor 700 is being regenerated and as long thereafter as the transfer of heat energy from the cracking catalyst to the reforming zones is sufficient to supply the required heat of the endothermic reforming reaction.

While the cracking catalyst in reactor 700 is being regenerated and the heat thus generated in part at least is being used to supply the required heat of reaction for the reforming reaction taking place in tubes 705, reactor 300 has been on stream with respect to the cracking reaction. That is to say, the cracking zone in reactor 300 having been purged and brought to a cracking temperature, cracking charge stock, e.g., gas oil at a temperature of about 600 to about 900° F., preferably about 750 to about 850° F., flows from coil 719 in heater 720 through line 721 to line 722. Valve 713 being closed and valve 313 being open the gas oil flows into a distributor (not shown) in reactor 300.

The vapors of the gas oil flow upwardly through the static bed of particle-form regeneratable cracking catalyst and the products of the reaction, i.e., cracking zone effluent flow from the cracking zone through line 315 under control of valve 324 and thence with valves 724 and 317 closed, through line 735 under the control of valve 735a to heat exchangers, stabilizers and/or fractionators, finishing, storage and/or distribution.

Eventually, the cracking catalyst in reactor 300 becomes at least partially deactivated by the coke deposited thereon. At that time reactor 300 is taken off stream. In the meantime, the cracking catalyst in reactor 700 has been re-generated and purged, and is ready for use again. Accordingly, the cracking charge stock, i.e., gas oil for example, is diverted from reactor 300 by closing valve 313 and is introduced into reactor 700 by opening valve 713.

The deactivated cracking catalyst in reactor 300 is purged with an inert and/or non-flammable gas such as flue gas drawn from a source not shown through pipe 310 under control of valve 311 and line 312. The purge gas is introduced into reactor 300, flows upwardly therethrough and is vented through line 315 and pipe 316 under control of valve 317 with valve 324 closed.

After purging, heated regenerating combustion-supporting gas such as air is drawn from a source not shown through pipe 334 and line 312 under control of valve 314. The regenerating gas flows upwardly through the bed of deactivated cracking catalyst burning off the coke deposited thereon and producing heat a part of which can be used, according to the principles of the present invention, to supply the heat required for the endothermic reforming reaction in tubes 305.

Accordingly, when the heat generated in the combustion of the coke on the cracking catalyst has raised the temperature of the substantially non-regeneratable reforming catalyst to a reforming temperature of, say about 800 to about 1000° F., when using the aforedescribed particle-form platinum-type reforming catalyst, the heated reformer charge mixture is diverted from tubes 305 by closing valve 727 and opening valve 327.

The heated reformer charge mixture flows from line 746 to line 347 and thence to manifold 328 and manifold branches 329. From branches 329 the reformer charge mixture flows into and upwardly through tubes 305 in contact with the substantially non-regeneratable reforming catalyst.

The products of the reforming reaction, i.e., the reformer effluent flows from tubes 305 through manifold branches 330 to manifold 331 and thence under control of valve 348, with valve 748 closed, to line 750, heat exchange equipment designated as 751 and line 752 to liquid-gas seperator 753.

In liquid-gas separator 753 the condensed reformer effluent separates from the uncondensed reformer effluent and flows therefrom through line 754.

The uncondensed reformer effluent is drawn from separator 753 through pipe 755 by compressor 756. The uncondensed reformer effluent is compressed to a pressure somewhat, say 5 to 10 p.s.i., greater than the pressure in tubes 305 by compressor 756 and discharged into pipe 757.

The uncondensed reformer effluent flows along pipe 757 to line 754 wherein it is admixed with condensed reformer effluent. The mixture of condensed and uncondensed reformer effluent flows through line 754 to condenser 758 and line 759 to liquid-gas separator 742.

In liquid-gas separator 742 the condensed reformer effluent, i.e., reformate, separates from the hydrogen-containing uncondensed reformer effluent and flows through line 760 to fractionation, storage and/or distribution, etc.

The hydrogen-containing uncondensed reformer effluent, i.e., recycle gas, separated in liquid-gas separator 742 flows through pipe 743 and line 739 to coil 740 in heater 741.

It will be noted that reactors 700 and 300 can be provided with means for removing excess heat during regeneration of the cracking catalyst when the heat generated is greater than that necessary to raise and maintain the reforming zones in tubes 705 and 305 at a reforming temperature. These means for removing excess heat comprise coils 761 and 762 in reactor 700 and coils 361 and 362 in reactor 300, pumps 763 and 363, heat conserving means such as steam generators 764 and 364 and associated piping.

Any suitable heat transfer medium such as steam, molten salts, low melting alloys, etc., can be used. The heat exchange medium is pumped through the heat conserving means 764 (364) by pump 763 (363) flows therefrom through pipe 765 (365) to coil 761 (361) thence through pipe 766 (366) to coil 762 (362) and back to pump 763 (363) through pipe 767 (367). In its passage through coils 761 (361) and 762 (362) the heat transfer medium absorbs heat from the regenerating cracking catalyst. In its passage through heat conserving means 764 (364) the heat transfer medium gives up to thus-absorbed heat.

The heat balance for the aforedescribed combined cracking and reforming operations wherein 10,000 barrels of gas oil are cracked per day to 53 percent conversion and 10,000 barrels of naphtha are reformed to 98 F-1, 3 cc. octane number at the conditions given in Table I, is given in the following tabulation:

|  | MM [1] B.t.u./Hr. | Percent |
|---|---|---|
| Heat Available: | | |
| From burning coke deposit on cracking catalyst | 61 | 100 |
| Heat Used: | | |
| Heat of Reaction for Reforming | 30 | 49 |
| Sensible Heat to Reformed Products | 4 | 7 |
| Heat of Reaction for Cracking | 11 | 18 |
| Sensible Heat to Cracked Products | 10 | 16 |
| Sensible Heat to Regeneration Gases | 6 | 10 |
| Total | 61 | 100 |

[1] MM=1×10$^6$.

Figure 5 is a flow-sheet illustrating the use of heat produced in a cyclic operation in excess of that required by the cyclic operation to supply the heat required for a substantially non-cyclic operation. The cyclic and substantially non-cyclic operations chosen for illustration are the substantially non-cyclic operation of converting methane, carbon dioxide and water to carbon monoxide and hydrogen and the cyclic operation of converting methane to carbon dioxide and water by contacting the methane with a regeneratable mass of copper oxide.

Two reactors are usually employed in order to have continuous operation of the cyclic reaction. Thus, reactors 500 and 501 are provided with a plurality of tubes 502 and 503. Reactors 500 and 501 are also provided with means (not shown) for introducing a suitable catalyst, for example, copper oxide associated with an inert carrier, into the spaces in reactors 500 and 501 surrounding the aforesaid plurality of tubes 502 and 503. Means (not shown) for withdrawing the aforesaid catalyst from the space surrounding tubes 502 and 503 are also provided.

At the outset, the spaces in reactors 500 and 501 surrounding tubes 502 and 503 respectively are filled with an active contact mass, e.g., copper oxide on an inert carrier.

A suitable particle-form reforming catalyst capable of converting carbon dioxide, methane and water to carbon monoxide and hydrogen, for example, is nickel.

The reforming catalyst, for example, nickel, is introduced into tubes 502 and 503 with caps 504 (505) so positioned that discs or plates 506 (507) rotatably mounted on rods 508 (509) and forming sliding joints with the inner peripheries of tubes 502 (503) are above the lower level of the catalyst surrounding tubes 502 (503). Caps 510 (511) and caps 504 (505) are positioned on tubes 502 (503) in a gas-tight manner.

After filling reactors 500 (501) and tubes 502 (503) respectively with the proper contact masses, the reactors are used alternately to produce carbon dioxide and water from methane and the tubes are used to produce carbon monoxide and hydrogen from the aforesaid carbon dioxide and water and added methane in the following manner.

Air under relatively low pressure of, say, 5 to 50 p.s.i., is blown through pipes 512 and 513 and thence under control of valve 514 with valves 515 and 516 closed to distributor 518 in reactor 500. The air contacts the catalyst outside tubes 502 and converts the metal to the oxide. The nitrogen and unused oxygen is vented through pipe 520 under control of valve 522. After blowing the cyclic catalyst with air, valve 514 is closed and valves 515 and 516 opened (valve 517 closed). Methane is blown from a source not shown through pipes 524 and 528 under control of valve 530 (valve 529 closed) to distributor 538.

The methane flows downwardly from distributor 538 through cyclic catalyst in reactor 500 forming carbon dioxide and water. The effluent from reactor 500 flows through collector 518 to pipe 532 under control of valve 516. From pipe 532 the carbon dioxide and water flows to pipe 541. Additional steam can be added through line 553 under control of valve 552 if desired. Methane is pumped from a source not shown through pipe 524 under control of valve 525 to pipe 541 where it is mixed with carbon dioxide and water produced in the cracking zone of reactor 500. The mixture of carbon dioxide, water and methane in pipe 541 flows therefrom to manifold 533 having branches 535.

The mixture of carbon dioxide, water and methane flows downwardly through the reforming zones in tubes 503 and is converted by the substantially non-cyclic reforming catalyst therein to carbon monoxide and hydrogen. The effluent of the reforming zones in tubes 503 flows therefrom through manifold branches 543 of manifold 545 and pipe 547 to synthesis tower not shown.

Meanwhile, air has been blowing from a source (not shown) through pipes 512 and 513 with valve 515 open and valve 517 closed to distributor 519. The air flows upwardly through the cyclic catalyst and the residue is vented through pipe 521 under control of valve 523. When the metal of the catalyst has been converted to the oxide, valves 515 and 523 close, and valve 517 opens.

Methane is blown from a source not shown through pipes 524 and 527 (valves 525 and 530 closed) to distributor 539. The methane flows downwardly from distributor 539 through the cyclic cracking catalyst in reactor 501. The carbon dioxide and water produced leave reactor 501 through distributor-collector 519 and 531. The metal oxide in reactor 501 is converted back to a metal in this portion of the cycle.

The carbon dioxide and water produced in the cracking zone of reactor 501 flows from distributor-collector 519 through pipe 531 to pipe 540. Additional steam can be added through line 551 under control of valve 550 if desired. In pipe 540 the carbon dioxide and water is mixed with methane pumped from a source not shown through pipe 524 under control of valve 526.

The mixture of carbon dioxide, water and methane flows through pipe 540 to manifold 534 having branches 536 thence downwardly through the reforming zones in tubes 502 in contact with the substantially non-cyclic reforming catalyst. The carbon monoxide and hydrogen produced in the reforming zones flow therefrom through manifold branches 542, manifold 544 and pipe 546 to the synthesis operation.

The oxidation of the cyclic catalyst with air and the reduction of the cyclic catalyst with methane to form carbon dioxide and water are both exothermic reactions while the formation of carbon monoxide and hydrogen from the carbon dioxide, water and methane is an endothermic reaction. In general the temperature of the cyclic catalyst bed will be in the range of 1200 to 2000° F., and preferably in the range of 1400 to 1800° F. The temperature of the non-cyclic zone in which heat is required should be at a temperature from 10 to 100° F. lower than the minimum temperature observed in the cyclic bed under any particular set of operating conditions.

The foregoing highly schematic flow-sheets are illustrative of a method of combining a cyclic reaction employing a regeneratable particle-form catalyst and a substantially non-cyclic reaction employing a substantially non-regeneratable catalyst so that heat in excess of that required for the cyclic reaction and produced at some time in the cycle of deactivation and regeneration of the regeneratable catalyst is used to supply the required heat of reaction of the substantially non-cyclic reaction. Accordingly, the present invention is a method of carrying on a substantially non-cyclic reaction employing a substantially non-regeneratable particle-form catalyst as defined hereinbefore in conjunction with a cyclic reaction employing a regeneratable particle-form catalyst and supplying heat required in the non-cyclic reaction from at least one portion of the cycle in the cyclic reaction.

We claim:

1. A method of supplying heat of reaction to an endothermic reaction which comprises establishing a first reaction zone having therein a plurality of second reaction zones each containing a static bed of substantially non-regenerable particle-form solid reforming catalyst (1) introducing hot active particle-form cracking catalyst into said first reaction zone, (2) flowing said hot active particle-form cracking catalyst downwardly through said first reaction zone as a substantially compact column of particle-form cracking catalyst in intimate contact and in indirect heat exchange relation with said plurality of said second reaction zones, (3) introducing a first hydrocarbon feed to be cracked into said first reaction zone at substantially reaction temperature, (4) contacting said first hydrocarbon feed with said moving column of cracking catalyst to produce first reaction zone reaction products and to deposit on said cracking catalyst an at least partially deactivating carbonaceous deposit hereinafter designated coke, (5) withdrawing said first reaction zone reaction products from said first reaction zone, (6) withdrawing cracking catalyst at least partially deactivated with said coke from said first reaction zone, (7) burning off said coke in a stream of combustion-supporting gas to regenerate said cracking catalyst and to heat said cracking catalyst to a temperature higher than the first reaction zone reaction temperature, introducing second hydrocarbon feed to be reformed and gaseous heat carrier at at least reaction temperature into each of said plurality of second reaction zones, contacting said second hydrocarbon feed and said gaseous heat carrier with said substantially nonregenerable reforming catalyst in said second reaction zones thereby producing an endothermic reaction, withdrawing reaction products from said second reaction zones, and regulating the temperature and the amount of hot active cracking catalyst introduced into said first reaction zone to supply at least the required heat of reaction in said first reaction zone and the required heat of endothermic reaction in said second reaction zones.

2. A method of supplying heat of reaction to an endothermic reaction which comprises establishing a first reaction zone, a regeneration zone, and a heat-exchange zone having therein a plurality of second reaction zones each containing a static bed of particle-form substantially non-regenerable reforming catalyst, introducing hot active particle-form solid cracking catalyst into said first reaction zone, flowing said particle-form cracking catalyst downwardly through said first reaction zone as a substantially compact column, introducing into said first reaction zone at at least the reaction temperature of said first reaction zone a first hydrocarbon feed to be cracked, intimately contacting said flowing substantially compact column of cracking catalyst with said first hydrocarbon feed to produce cracked hydrocarbons and to deposit on said catalyst an at least partially deactivating carbonaceous material hereinafter designated coke, withdrawing cracked hydrocarbons from said first reaction zones, withdrawing cracking catalyst at least partially deactivated with the aforesaid deposited coke from said first reaction zone, burning off said coke in a stream of combustion-supporting gas to regenerate said cracking catalyst and to heat said cracking catalyst to a temperature higher than said first reaction zone reaction temperature, introducing said cracking catalyst at a temperature higher than said first reaction zone reaction temperature into said heat exchange zone, flowing said regenerated hot cracking catalyst through said heat exchange zone in intimate contact with and in indirect heat exchange relation with said second reaction zones, introducing a second hydrocarbon feed and a gaseous heat carrier into each of said second reaction zones at at least the reaction temperature of said second reaction zones to produce an endothermic reaction resulting in the formation of reformed hydrocarbons, withdrawing reformed hydrocarbons from said second reaction zones, withdrawing hot regenerated cracking catalyst from said heat exchange zone at a temperature higher than the reaction temperature of said first reaction zone, regulating the temperature and amount of hot regenerated cracking catalyst flowing through said heat exchange zone to supply the required heat of said endothermic reaction, and regulating the temperature and quantity of regenerated hot cracking catalyst withdrawn from said heat-exchanged zone and introduced into said first reaction zone to supply the required heat of reaction in said first reaction zone.

3. A method of supplying heat of reaction to an endothermic reaction which comprises establishing a first reaction zone and a regeneration zone having therein a plurality of second reaction zones each containing a static bed of particle-form solid substantially non-regenerable reforming catalyst, introducing hot active particle-form solid cracking catalyst into said first reaction zone, flowing said hot active cracking catalyst downwardly as a substantially compact column through said first reaction zone, introducing a first hydrocarbon feed to be cracked into said first reaction zone, intimately contacting said first hydrocarbon feed with said downwardly flowing substantially compact column of cracking catalyst to produce cracked hydrocarbons and to deposit on said cracking catalyst an at least partially deactivating carbonaceous deposit hereinafter designated coke, withdrawing cracked hydrocarbons from said first reaction zone, withdrawing cracking catalyst and deposited coke from said first reaction zone, introducing said cracking catalyst and said deposited coke into said regeneration zone, introducing combustion-supporting gas into said regeneration zone, flowing said cracking catalyst downwardly through said regeneration zone in indirect heat-exchange relation with said second reaction zones, intimately contacting said combustion-supporting gas and said downwardly flowing catalyst and coke to burn off said coke to regenerate said cracking catalyst and to heat said cracking catalyst to a temperature higher than the said first reaction zone temperature, withdrawing regenerated catalyst from said regenerating zone, introducing said regenerated catalyst into said first reaction zone, introducing a second hydrocarbon feed and a gaseous heat carrier at at least reaction temperature into said second reaction zones, intimately contacting said second hydrocarbon feed and said gaseous heat carrier with said static beds of substantially non-regenerable reforming catalyst in said second reaction zones to produce an endothermic reaction and to produce reformed hydrocarbons, withdrawing reformed hydrocarbons from said second reaction zones, regulating the temperature and amount of cracking catalyst flowing through said regeneration zone to supply the required heat of reaction for the endothermic reaction taking place in said second reaction zones, and regulating the temperature and amount of the regenerated cracking catalyst introduced into said first reaction zone to supply the required heat of reaction in said first reaction zone.

4. A method of supplying heat of reaction to an endothermic reaction employing a non-regenerable particle-form catalyst which comprises establishing a first reaction zone having therein a plurality of second reaction zones each containing a static bed of substantially non-regenerable particle-form reforming catalyst, establishing a static bed of regenerable particle-form cracking catalyst in said first reaction zone in indirect heat-exchange relation with said plurality of second reaction zones, raising the temperature of said cracking catalyst to a cracking temperature, flowing a crackable first hydrocarbon feed at at least cracking temperature through said first reaction zone to produce cracking-reaction products and to lay down a deactivating carbonaceous deposit hereinafter designated coke on said cracking catalyst, withdrawing said cracking-reaction products from said first reaction zone, continuing to pass said first hydrocarbon feed through said first reaction zone and to lay-down said coke until the decrease in catalyst activity requires removal of said coke by combustion thereof, stopping the introduction of said first hydrocarbon feed into said first reaction zone, purging said first reaction zone, burning off said coke on said cracking catalyst in a stream of combustion-supporting gas to raise the temperature of said cracking catalyst higher than said cracking temperature and to raise the temperature of said substantially non-regenerable reforming catalyst to reforming temperature, introducing at reforming temperature a reformable-hydrocarbon second feed and a gaseous heat carrier into each of said second reaction zones, intimately contacting said second hydrocarbon feed with said reforming catalyst in said second reaction zones to produce an endothermic reaction and to produce reformed hydrocarbons, and withdrawing reformed hydrocarbons from said second reaction zones, the heat generated in said first reaction zone during regeneration by combustion of said coke on said cracking catalyst being sufficient to supply the required heats of reaction of said reforming reaction and of said cracking reaction.

5. A method of supplying heat of reaction to an endothermic reaction which comprises establishing a first reaction zone having therein a plurality of second reaction zones each containing a static bed of substantially non-regenerable particle-form contact material to catalyze the conversion of methane, carbon dioxide and water to carbon monoxide and hydrogen, filling the spaces around said second reaction zones in said first reaction zone with a regenerable particle-form contact material comprising a metal oxide to catalyze the conversion of methane to carbon dioxide and water, raising the temperature of said catalyst in said first reaction zone to reaction temperature, introducing methane into said first reaction zone and withdrawing carbon dioxide and water from said first reaction zone until the metal oxide of said catalyst is reduced substantially to the corresponding metal, stopping the flow of methane to said first reaction zone, purging said first reaction zone, regenerating the catalyst in said first reaction zone with a gas containing free oxygen to convert said metal of said catalyst to the oxide and to produce heat in excess of the required heat of reaction of the first reaction zone and sufficient to supply the required heat of reaction of said second reaction zones, introducing methane, carbon dioxide and water at reaction temperature into said second reaction zones, and withdrawing carbon monoxide and hydrogen from said second reaction zones.

6. In the method of supplying heat of reaction to endothermic reactions wherein at least one first reaction zone a static bed of particle-form solid substantially non-regenerable catalytic material is contacted with a first hydrocarbon stream at at least reaction temperature to produce a first endothermic reaction, wherein in a second reaction zone in a cyclic manner a second hydrocarbon stream at at least reaction temperature is contacted with a particle-form solid second catalytic material producing a second endothermic reaction and at least partially deactivating said second catalytic material during an on-stream period, wherein contact between said second catalytic material and said second hydrocarbon stream is interrupted, wherein the catalytic activity of said second catalytic material is at least partially restored in a regeneration period in an exothermic reaction and heat is stored in said second catalytic material, and wherein said at least partially regenerated second catalytic material in a second on-stream period is contacted with said second hydrocarbon stream producing an endothermic reaction, the improvement which comprises regenerating said second catalytic material in an exothermic reaction to produce and store in said at least partially regenerated second catalytic material heat in excess of that required for said endothermic reaction in said second reaction zone, and providing indirect heat exchange between said second catalytic material containing excess heat and said first catalytic material while in proximity with respect to each other thereby supplying the heat of reaction required for said first endothermic reaction and the heat of reaction required for said second endothermic reaction.

References Cited in the file of this patent

UNITED STATES PATENTS

| 2,139,351 | Bejarno | Dec. 6, 1938 |
| 2,266,033 | Harrison et al. | Dec. 16, 1941 |

(Other references on following page)

UNITED STATES PATENTS

| | | |
|---|---|---|
| 2,283,832 | Thomas | May 19, 1942 |
| 2,304,203 | Pyzel et al. | Dec. 8, 1942 |
| 2,348,009 | Johnson et al. | May 2, 1944 |
| 2,363,874 | Krebs | Nov. 28, 1944 |
| 2,389,448 | Mekler | Nov. 20, 1945 |
| 2,412,025 | Zimmerman | Dec. 3, 1946 |
| 2,541,657 | Lynch et al. | Feb. 13, 1951 |
| 2,547,021 | Lassiat et al. | Apr. 3, 1951 |
| 2,625,470 | Roberts | Jan. 13, 1953 |
| 2,642,381 | Dickinson | June 16, 1953 |
| 2,684,325 | Deanesly | July 20, 1954 |
| 2,735,802 | Jahnig | Feb. 21, 1956 |
| 2,763,600 | Adams et al. | Sept. 18, 1956 |